United States Patent
Deiss et al.

(10) Patent No.: US 9,435,262 B2
(45) Date of Patent: Sep. 6, 2016

(54) FUEL NOZZLE HAVING AN INNER TUBE AND AN OUTER TUBE ENGAGED WITH THE INNER TUBE

(71) Applicant: SIEMENS AKTIENGESELLSCHAFT, München (DE)

(72) Inventors: Olga Deiss, Düsseldorf (DE); Berthold Köstlin, Duisburg (DE); Jaap Van Kampen, Roermond (NL)

(73) Assignee: SIEMENS AKTIENGESELLSCHAFT (DE)

( * ) Notice: Subject to any disclaimer, the term of this patent is extended or adjusted under 35 U.S.C. 154(b) by 197 days.

(21) Appl. No.: 14/364,277

(22) PCT Filed: Nov. 9, 2012

(86) PCT No.: PCT/EP2012/072225
§ 371 (c)(1),
(2) Date: Jun. 10, 2014

(87) PCT Pub. No.: WO2013/087310
PCT Pub. Date: Jun. 20, 2013

(65) Prior Publication Data
US 2015/0000285 A1  Jan. 1, 2015

(30) Foreign Application Priority Data

Dec. 12, 2011  (EP) .................................... 11192971

(51) Int. Cl.
*F23R 3/28* (2006.01)
*F02C 7/22* (2006.01)
(Continued)

(52) U.S. Cl.
CPC ................ *F02C 7/22* (2013.01); *F23D 14/24* (2013.01); *F23D 14/58* (2013.01); *F23D 17/00* (2013.01);
(Continued)

(58) Field of Classification Search
CPC ........ F23R 3/283; F23R 3/36; F23D 17/002; F23D 14/58; F02C 7/22
See application file for complete search history.

(56) References Cited

U.S. PATENT DOCUMENTS 2,583,659 A    1/1952  Martin
2,803,296 A *  8/1957  Young .................. F23D 11/408
                                                    239/404
(Continued)

FOREIGN PATENT DOCUMENTS

CN    1080376 A    1/1994
CN    1779223 A    5/2006
(Continued)

OTHER PUBLICATIONS

Office Action dated Jun. 24, 2015 issued in corresponding Chinese Patent Application No. 201280061257.7.
(Continued)

*Primary Examiner* — Gerald L Sung
*Assistant Examiner* — Scott Walthour
(74) *Attorney, Agent, or Firm* — OSTROLENK FABER LLP

(57) ABSTRACT

A fuel nozzle (2) for two fuels, with an inner pipe (5) with radially oriented outlet openings (7) for a first fuel and with an outer pipe (6), surrounding the inner pipe (5), with axially oriented outlet openings (10) for a second fuel; an axially extending groove (18) on an outer surface of the inner pipe (5) and a projection (19) inward from the outer pipe which engages in the groove (18) as an anti-torsion device (17) and which is arranged between two axial outlet openings (10). Alternative groove and projection configurations are disclosed.

9 Claims, 6 Drawing Sheets

(51) Int. Cl.
  *F23D 17/00* (2006.01)
  *F23R 3/36* (2006.01)
  *F23D 14/24* (2006.01)
  *F23D 14/58* (2006.01)

(52) U.S. Cl.
  CPC ............ *F23D 17/002* (2013.01); *F23R 3/283* (2013.01); *F23R 3/36* (2013.01); *F23D 2900/14701* (2013.01); *F23R 2900/00002* (2013.01)

(56) References Cited

U.S. PATENT DOCUMENTS

| | | | |
|---|---|---|---|
| 3,901,445 A | 8/1975 | Chang | |
| 7,434,384 B2 | 10/2008 | Lord et al. | 60/262 |
| 8,959,922 B2 | 2/2015 | Colmegna et al. | 14/22 |
| 2006/0242944 A1 | 11/2006 | Anderson | 60/262 |
| 2008/0108488 A1 | 5/2008 | Delisle et al. | 493/10 |

FOREIGN PATENT DOCUMENTS

| | | |
|---|---|---|
| CN | 102165258 A | 8/2011 |
| EP | WO 93/09370 | 5/1993 |
| GB | 173901 A | 10/1920 |
| GB | 223413 A | 10/1924 |
| WO | WO 2010/034819 A1 | 4/2010 |

OTHER PUBLICATIONS

International Search Report dated Feb. 11, 2013 issued in corresponding International patent application No. PCT/EP2012/072225.

Written Opinion dated Feb. 11, 2013 issued in corresponding International patent application No. PCT/EP2012/072225.

European Search Report dated Jun. 4, 2012 issued in corresponding European patent application No. 11 19 2971.

\* cited by examiner

FUEL NOZZLE HAVING AN INNER TUBE AND AN OUTER TUBE ENGAGED WITH THE INNER TUBE

CROSS-REFERENCE TO RELATED APPLICATIONS

The present application is a 35 U.S.C. §§371 national phase conversion of PCT/EP2012/072225, filed Nov. 9, 2012, which claims priority of European Patent Application No. 11192971.7, filed Dec. 12, 2011, the contents of which are incorporated by reference herein. The PCT International Application was published in the German language.

TECHNICAL FIELD

The invention relates to a fuel nozzle for two fuels for a gas turbine and a burner, especially a jet burner for a gas turbine.

TECHNICAL BACKGROUND

For improved availability of fuels and for using alternative fuels in gas turbines, the injection of different fuels is combined. This is brought about by means of a double fuel nozzle (dual fuel nozzle) which comprises two tubes which fit into each other. A first fuel is injected through the outer tube by means of a lobe mixer. A second fuel is added through the inner tube perpendicularly to the air flow (cross inflow). For a stable operation, the position of the lobe mixer in relation to the inner tube is vital.

SUMMARY OF THE INVENTION

It is the object of the invention to improve the construction and the operation of a gas turbine. This object is achieved by the invention disclosed herein.

According to a first aspect of the invention, a fuel nozzle for two fuels is provided, having an inner tube with radially oriented discharge openings for a first fuel and having an outer tube, encompassing the inner tube, with axially oriented discharge openings for a second fuel. The invention comprises an axially extending groove on an outer surface of the inner tube and a projection inward from the outer tube which engages in the groove, to serve as an anti-rotation device and the projection is arranged between two axial discharge openings of the outer tube. The second fuel can be of the same type as or identical to the first fuel. The references to first and second fuels are selected for better differentiation and do not necessarily have any functional reference. The axially oriented discharge openings of the outer tube can be constructed as a so-called lobe mixer, in which the discharge openings are formed between regions of the outer tube which are impressed or reduced in circumference so that lobe-shaped injection regions are created.

The anti-rotation device prevents relative rotation of the two nozzles and so allows permanent, stable positioning of the two nozzles and their discharge openings in relation to each other and stable operation with two fuels, such as natural gas and synthesized gas. The simple construction and the simple installation allow an inexpensive realization.

Provision can be made for a plurality of grooves and projections. This can increase the robustness and fail safety of the fuel nozzle. It may be that projections and corresponding grooves are arranged between all the axial discharge openings.

The groove can have the shape of a circle segment and the projection can have a corresponding rounding. This complies with the natural shape of a lobe mixer and allows a simple realization and good integration into existing systems.

The outer tube can have radial recesses in the region of the radial discharge openings of the inner tube. These recesses, which can be in the shape of a circle segment, for example, prevent the radial discharge openings from being covered or blocked by the outer tube or by the lobe mixer on account of thermal expansions during operation. The recesses can be arranged in each case between two axial discharge openings, and preferably in the middle of the distance between those openings.

The axial discharge openings of the outer tube can be convoluted and the groove of the inner tube can extend from one axial discharge opening right into an adjacent axial discharge opening. This convoluted construction is also referred as a twisted lobe mixer. Since the projection of the outer tube extends over a larger circumferential region as a result of the convolution, the groove is correspondingly enlarged in order to also ensure an optimum resistance to rotation in this case.

The axial discharge openings can be convoluted and the groove can be convoluted with an identical or similar convolution angle to the axial discharge openings. In this way, the groove and projection also engage directly with each other in the case of the twisted lobe mixer design.

Axial positioning of the inner tube in relation to the outer tube can be carried out by means of a screwed pipe connection or a similar threaded connection. During the axial positioning, the distance between the radial discharge openings and the outer tube or lobe mixer is set in order to compensate thermal expansions during operation.

According to a second aspect of the invention, a fuel nozzle for two fuels has an inner tube with radially oriented discharge openings for a first fuel and has an outer tube, encompassing the inner tube, with axially oriented discharge openings for a second fuel. This aspect comprises an axially extending projection on an outer surface of the inner tube, which engages in an axially oriented discharge opening of the outer tube as an anti-rotation device. In this construction, the projection is attached on the inner tube and engages in an axially oriented discharge opening. This construction can be simpler for specific applications. Otherwise, the same advantages and modifications as described above are applicable.

A plurality of projections may be provided. This can increase the robustness and fail safety. Projections may be provided for all the axial discharge openings.

According to a further aspect, the invention is directed towards a burner, especially a jet burner, for a gas turbine, wherein the burner has a fuel nozzle, as described previously. The same advantages and modifications as described above are applicable.

According to yet another aspect, the invention is directed towards a gas turbine with a combustion space and a flow direction, having a burner as described previously. The same advantages and modifications as described above are applicable.

In the following text, the invention is described in more detail with reference to the drawings, in which:

DESCRIPTION OF EMBODIMENTS

The drawings serve purely for explanation of the invention and do not limit this. The drawings and the individual parts are not necessarily to scale. The same designations refer to the same or identical parts.

Figure 1:
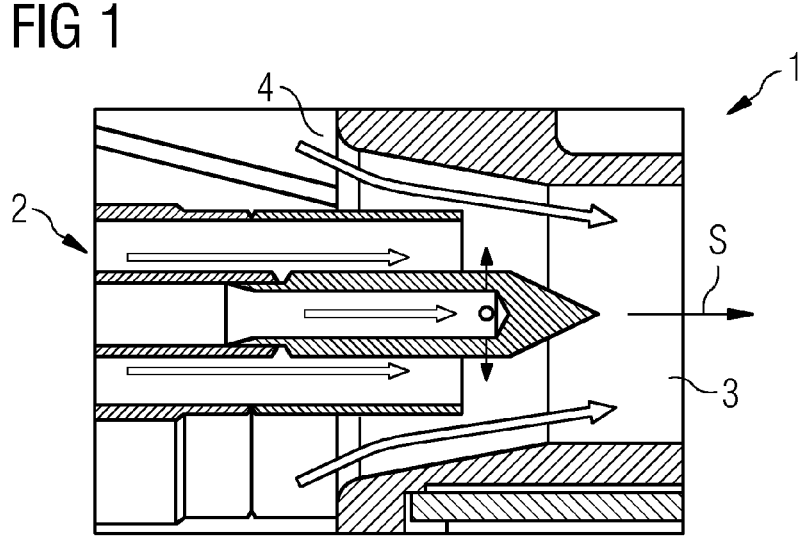
FIG. 1 shows a simplified representation of a fuel nozzle according to the invention.

FIG. 1 shows a simplified representation of a part of a gas turbine 1 with a fuel nozzle 2. A plurality of fuel nozzles 2, for example twelve or sixteen, are arranged concentrically to a flow direction S of the gas turbine 1.

The fuel nozzle 2 is suitable for the simultaneous injection of two fuels, for example natural gas and synthesized gas. The fuel nozzle 2 is oriented in a combustion space or prechamber 3 of the gas turbine. An air inlet duct 4 can encompass the fuel nozzle 2 so that downstream of the fuel nozzle 2, or in the region thereof, and in the direction of the flow S, mixing of the fuel with air takes place.

Figure 2:
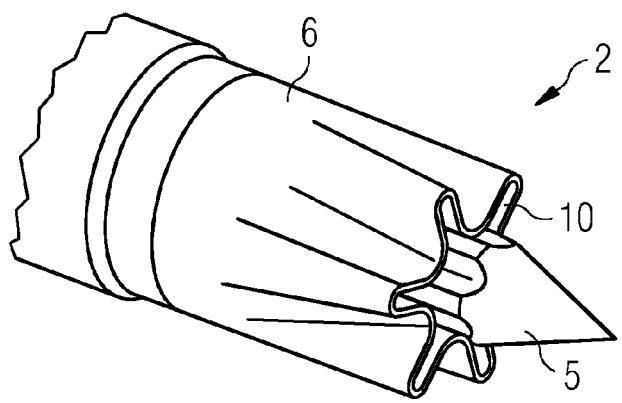
FIGS. 2 to 6 show a first example of a fuel nozzle with a straight lobe according to the invention.
Figure 3:
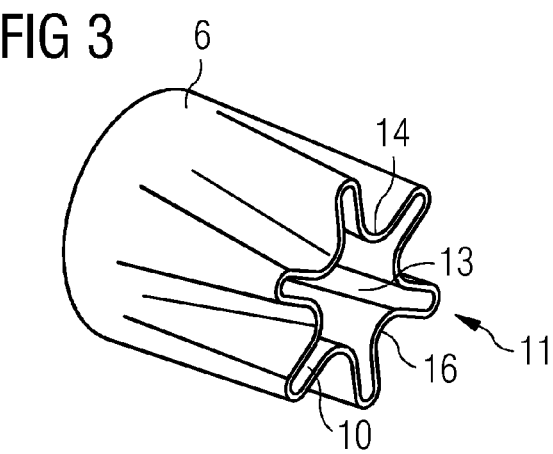
Figure 4:
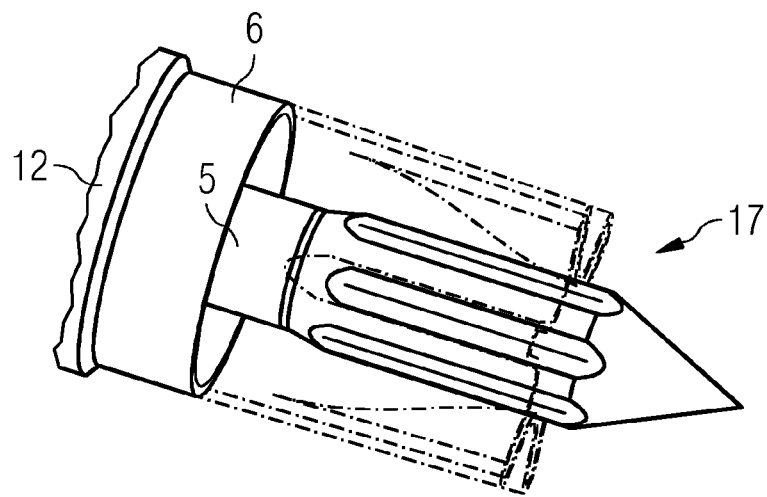
Figure 5:
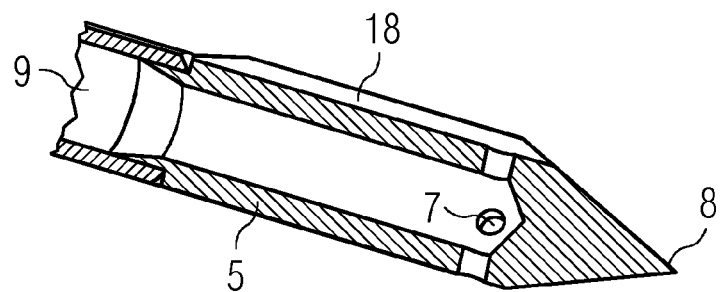
Figure 6:
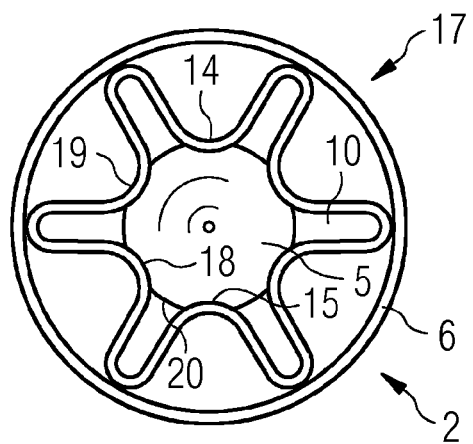
Figure 7:
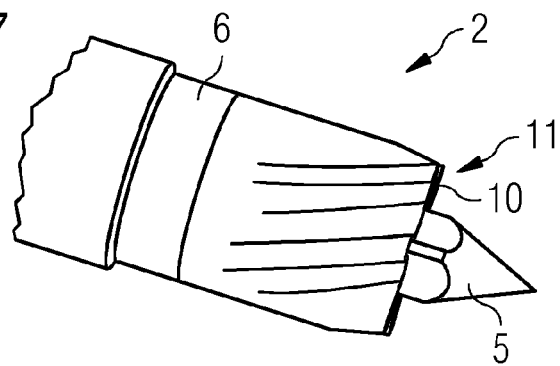
FIGS. 7 to 11 show a second example of a fuel nozzle with a twisted lobe according to the invention.
Figure 8:
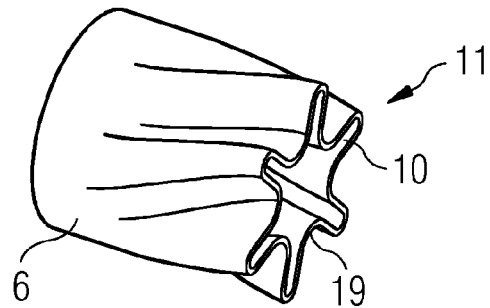
Figure 9:
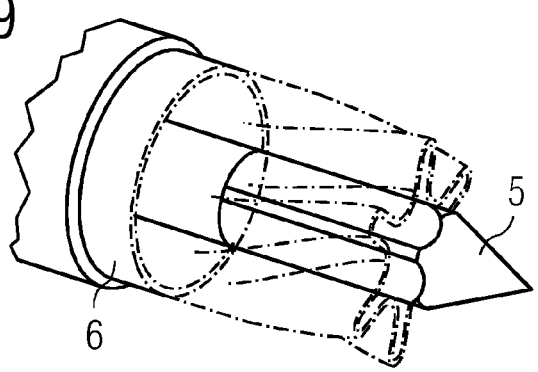
Figure 10:
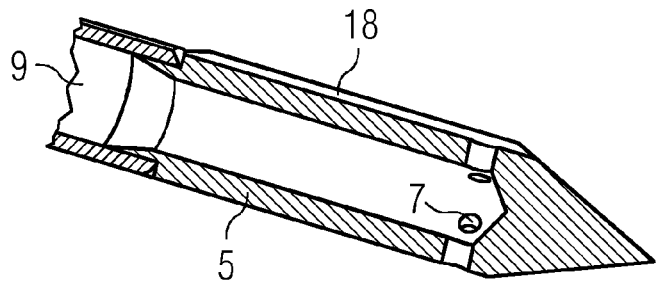
Figure 11:
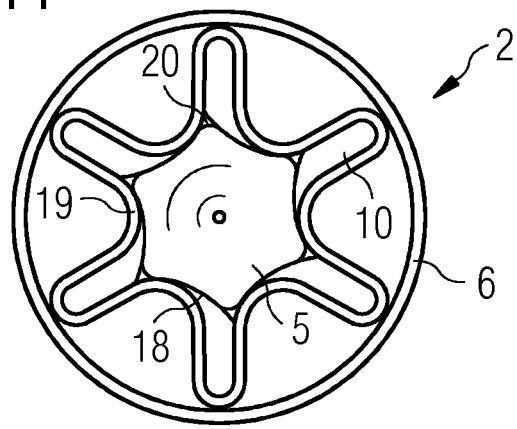
Figure 12:
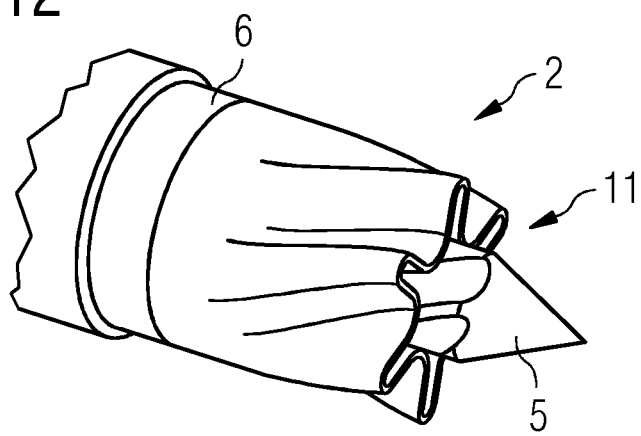
FIGS. 12 to 16 shows a third example of a fuel nozzle with a twisted lobe according to the invention.
Figure 13:
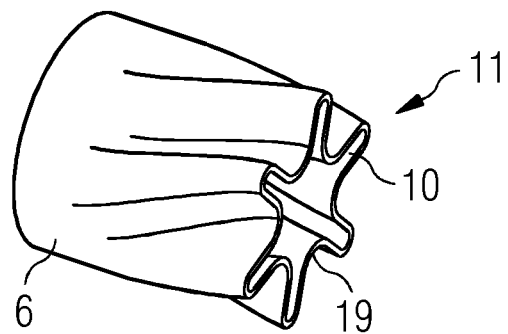
Figure 14:
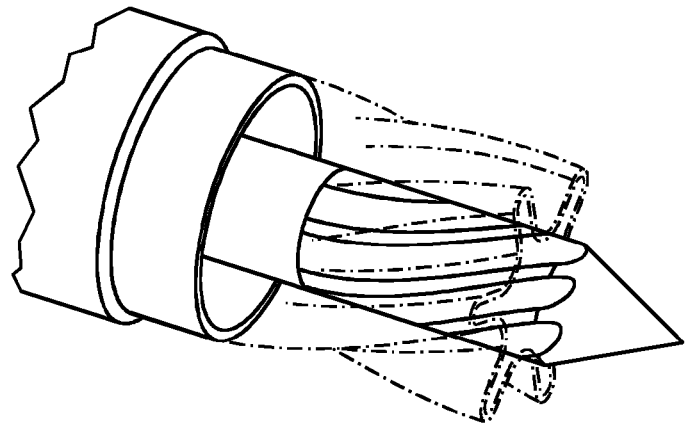
Figure 15:
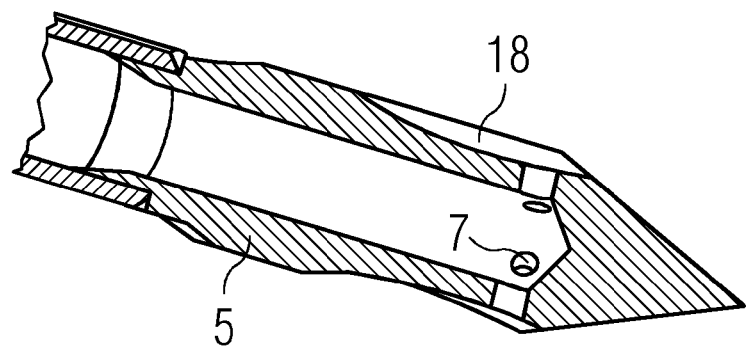
Figure 16:
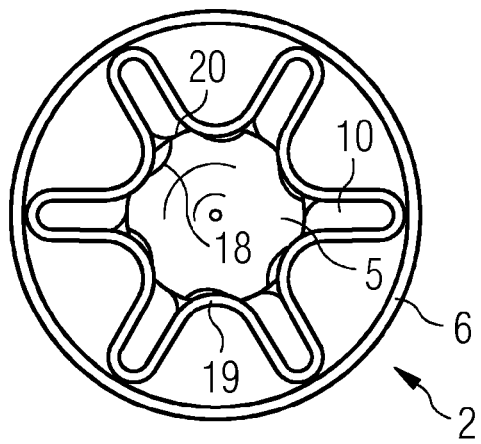

In FIGS. 2 to 6, a first embodiment of the fuel nozzle 2 is shown in detail. The fuel nozzle 2 is of the straight lobe mixer type and comprises an inner tube 5 and an outer tube 6 which encompasses the inner tube 5. FIGS. 2, 4 and 6 show views of the fuel nozzle 2 in the installed state, and in FIGS. 3 and 5 the outer tube 6 and the inner tube 5 are shown separately.

The inner tube 5 has a plurality of radially oriented discharge openings 7 for a first fuel, for example natural gas. The openings 7 are distributed over the circumference of the tube 5, preferably equidistantly in relation to each other. Although provision is made here for six discharge openings 7,] the number of openings 7 selected can be different, depending upon the application.

The radially oriented discharge openings 7 are arranged upstream of a nozzle tip 8 in which the inner tube 5 terminates. Either an end region which is attached to a feed pipe 9 and comprises the nozzle tip 8 and the radially oriented discharge openings 7, or the end region plus feed pipe 9, or a part thereof, can be referred to as inner tube 5.

The outer tube 6 has axially oriented discharge openings 10 for a second fuel, for example synthesized gas. The terms axially and radially refer to the longitudinal direction or rotational axes of the two tubes 5 and 6, or to the flow direction S. Both tubes are arranged parallel to the flow direction S.

On the downstream disposed end, the outer tube 5 has a so-called lobe mixer 11. The lobe mixer 11 or the axially oriented discharge openings 10 inject the fuel in the axial direction so that mixing with the fuel which is injected radially from the radially oriented discharge openings of the inner tube 5 takes place. The outlet openings 7 are located beyond the end of the outer tube, as shown in FIG. 1, which promotes the mixing. Either an end region which is attached to a feed pipe 12 and comprises the lobe mixer 11 and the axially oriented discharge openings 10, or the end region plus feed pipe 12, or a part thereof, can be referred to as outer tube 6.

The axially oriented discharge openings 10 extend from the outer circumference of the outer tube 6 or of the lobe mixer 11, which in most cases is slightly reduced in diameter, as far as an open middle region 13 of the outer tube through which the inner tube 5 is guided. The axially oriented discharge openings 10 are connected to the middle region 13 so that an opening which is star-shaped in plan view is created (FIG. 6). The axially oriented discharge openings can also be separated from the middle region 13.

Each of the axially oriented discharge openings 10 are arranged circumferentially between sections 14 which are impressed or deep drawn in the radial direction. The sections 14 begin in the upstream disposed region on the outer circumferential surface and extend in the direction of downstream disposed end face as far as the central middle region 13.

The sections 14 have roundings 15 on their respective radially inner ends or on the inner side. In the region of these roundings 15, provision is made for radial openings or recesses 16 which, extending from the downstream disposed end face, are formed in the shape of a semicircle. These openings 16 are arranged in such a way that with the fuel nozzle 2 assembled, they lie in the region of the radially oriented discharge openings 7. This ensures that in the event of thermal expansion during operation of the fuel nozzle 2 the fuel can discharge from the inner tube 5 unhindered through the radially oriented discharge openings 7.

The fuel nozzle 2 is provided with an anti-rotation device 17 which ensures that the inner tube 5 and the outer tube 6 cannot rotate in relation to each other, that is to say they are always located in the optimum position, so that the radially oriented discharge openings 7 and the axially oriented discharge openings 10 are always optimally aligned with each other.

The anti-rotation device has a projection or a tongue and a groove or recess which inter-engage and so prevent rotation in the circumferential direction. A part of the anti-rotation device 17 is provided on the inner tube 5 and the other part is provided on the outer tube 6.

In this case, an axially extending groove 18 on an outer surface of the inner tube 5 and a projection 19 of the outer tube 6, which engages in the groove 18, are provided as the anti-rotation device. The projection 19 is arranged circumferentially between two axial discharge openings 10 and is a feature of the section 14 or of the rounding 15. The projection 19 can also correspond to the rounding 15. The groove 18 is in the shape of a circle segment, wherein the radius of the groove 18 is adapted to the radius of the projection 19. Alternatively, the radius of the projection 19 can be adapted to the radius of the groove 18. The depth, i.e. the extent in the radial direction, of groove 18 and projection 19 is dimensioned in such a way that rotation of the two tubes 5, 6 against each other in the circumferential direction during operation of the fuel nozzle 2 is prevented.

The axial length of the groove 18 is of a greater dimension than the axial length of the projection 19 so that centering, guiding and resistance to rotation of the tube 5 against the outer tube 6 is also realized in the event of thermal expansion during operation. The alignment of the two tubes or fuel passages in the circumferential direction is therefore carried out automatically.

Provision is made for a plurality of grooves 18 and projections 19 which are distributed over the circumference. In this case, the number of grooves 18 and projections 19 corresponds to the number of discharge openings, i.e. provision is made for six grooves 18 and six projections 19. The number of grooves 18 and projections 19 can be freely selected but does not exceed the number of discharge openings.

Formed between the grooves 18 are projections or points 20 which engage in the axially oriented discharge openings 10. This can also be a feature of the anti-rotation device 17. Alternatively, it is possible to provide projections or points instead of grooves 20 on the inner tube 5, which projections or points engage in the axially oriented discharge openings 10. In this case also, it is possible to provide just one point or a plurality of points 20.

Shown in FIGS. 7 to 11 is a further example of a fuel nozzle 2 with an anti-rotation device 17. As in the case of the fuel nozzle shown in FIGS. 2 to 6, an inner tube 5 is provided with radially oriented discharge openings 7 and an outer tube 6 is provided with axially oriented discharge openings 10.

A lobe mixer 11 is similarly provided on the outer tube 6. Here there is no provision for a rectilinear or so-called straight lobe mixer but instead provision for a convoluted or so-called twisted lobe mixer. In this case, the axial discharge openings 10 are each convoluted in the circumferential direction, for example helically around the outer tube, so that the axially open axial discharge openings 10 do not extend continuously in the axial direction, but each such opening contains a circumferential component. The same applies to the sections 14 between the axial discharge openings 10 with the roundings 15 or with the projections 19.

The grooves 18 in the outer surface of the inner tube now extend from one axial discharge opening 10 right into an adjacent axial discharge opening 10. Put another way, a groove 18 now covers a greater circumferential area in comparison to that covered area in the example shown in FIGS. 2 to 6. In the fuel nozzle from FIGS. 2 to 6, individual grooves 18 are recessed in the outer circumferential surface of the inner tube 5, between which grooves a circumferential surface is located in each case. In the case of the fuel nozzle from FIGS. 7 to 11, a groove 18 continues in series directly to a further groove 18. This allows insertion of the inner tube 5 into the outer tube 6 in the axial direction.

Formed between the grooves 18 are projections or points 20 which engage in the axially oriented discharge openings 10. This can also be a feature of the anti-rotation device 17. Alternatively, it is possible to provide projections or points 20 instead of grooves on the inner tube 5, which projections or points engage in the axially oriented discharge openings 10. In this case also, it is possible to provide just one point or a plurality of points 20.

With regard to the discharge openings 7, 10 and the openings 16, which compensate thermal expansion, the fuel nozzle 2 of FIGS. 7 to 11 is identical or similar to the fuel nozzle 2 of FIGS. 2 to 6.

Shown in FIGS. 12 to 16 is a further example of a fuel nozzle 2. In this case, as shown in FIGS. 7 to 11, the axial discharge openings 10 are again convoluted, for example helically around the outer tube, i.e. a convoluted or so-called twisted lobe mixer is used.

The grooves 18 are now convoluted with an identical or similar convolution angle to the axial discharge openings 10. Otherwise, the example which is shown here corresponds wholly or in the main to the example which is shown in FIGS. 7 to 11. During installation of the fuel nozzle 2, that is to say during assembly of the inner tube 5 and the outer tube 6, the inner tube 5 is, so to speak, screwed into the outer tube 6.

Formed between the grooves 18 are projections or points 20 which engage in the axially oriented discharge openings 10. This can also be a feature of the anti-rotation device 17. Alternatively, it is possible to provide projections or points 20 instead of grooves on the inner tube 5, which projections or points engage in the axially oriented discharge openings 10. In this case also, it is possible to provide just one point or a plurality of points 20.

Figure 17:
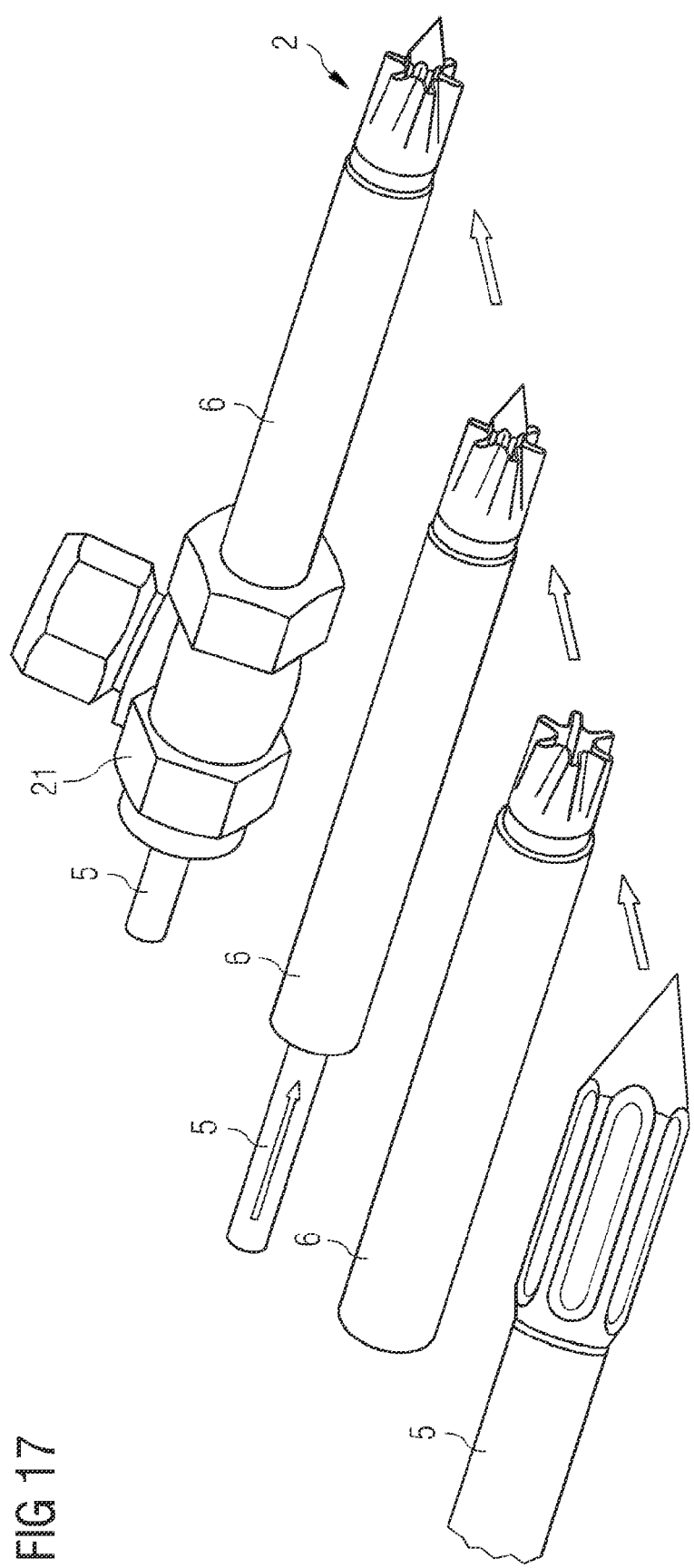
FIG. 17 shows an exemplary installation process of a fuel nozzle according to the invention.

Shown in FIG. 17 is the installation or assembly of the fuel nozzle 2. After completion of the inner tube 5 (on the left in the figure) and of the outer tube 6 (one step further), which, for example, can be realized by means of welding processes, the two tubes 5, 6 are inserted one into the other in a third step, wherein the anti-rotation device 17 interengages in order to thus define the position of the two tubes in the circumferential direction.

After this, the distance in the axial direction between the inner tube 5, or the radially oriented discharge openings 7, and the outer tube 6, or the radially oriented discharge openings 7, is set. As a result, thermal expansions during operation can be compensated.

Next, a connection between the two tubes 5, 6 is made via a threaded connection 21, such as a screwed pipe connection. After this, the fuel nozzle 2 is installed in the gas turbine 1.

The invention claimed is:

1. A fuel nozzle for two fuels, comprising:
   an inner tube for providing a first fuel, the inner tube having radially oriented discharge openings;
   an outer tube for providing a second fuel and encompassing the inner tube, the outer tube defining a lobe mixer having axially oriented discharge openings;
   at least one axially extending groove on an outer surface of the inner tube; and
   wherein the lobe mixer defines at least one projection extending inward to engage the inner tube in the at least one axially extending groove to define an anti-rotation device that prevents rotation of the inner tube and the outer tube relative to each other, wherein the at least one projection is arranged between two of the axial discharge openings, and the projection is an impressed or deep drawn section of the outer tube or is a rounded portion of the outer tube.

2. The fuel nozzle as claimed in claim 1, further comprising a plurality of axially extending grooves and a plurality of projections.

3. The fuel nozzle as claimed in claim 1, wherein, a cross-sectional shape of the at least one axially extending groove is circular and the at least one projection is correspondingly rounded to the cross-sectional shape of the at least one axially extending groove.

4. The fuel nozzle as claimed in claim 1, wherein the radially oriented discharge openings are at respective first circumferential regions around the inner tube; and the outer tube has second circumferential regions and radial recesses in the second circumferential regions circumferentially aligned with the respective first circumferential regions around the inner tube.

5. The fuel nozzle as claimed in claim 1, wherein the axially oriented discharge openings are convoluted and the at least one axially extending groove extends from one axially oriented discharge opening into an adjacent axially oriented discharge opening.

6. The fuel nozzle as claimed in claim 1, wherein the axially oriented discharge openings are convoluted and the at least one axially extending groove is convoluted with an identical or similar convolution to the convolution of the axially oriented discharge openings and the convolution of the at least one axially extending groove is at an identical or similar angle to an angle of the convolution of the axial discharge openings.

7. The fuel nozzle as claimed in claim 1, further comprising a screwed pipe connection, wherein the inner tube is axially positioned relative to the outer tube and the inner tube and the outer tube are connected by the screwed pipe connection.

8. A burner having at least one fuel nozzle as claimed in claim 1.

9. A gas turbine with a combustion space and a flow direction through the combustion space and having at least one burner as claimed in claim 8.

* * * * *